Patented Aug. 1, 1939

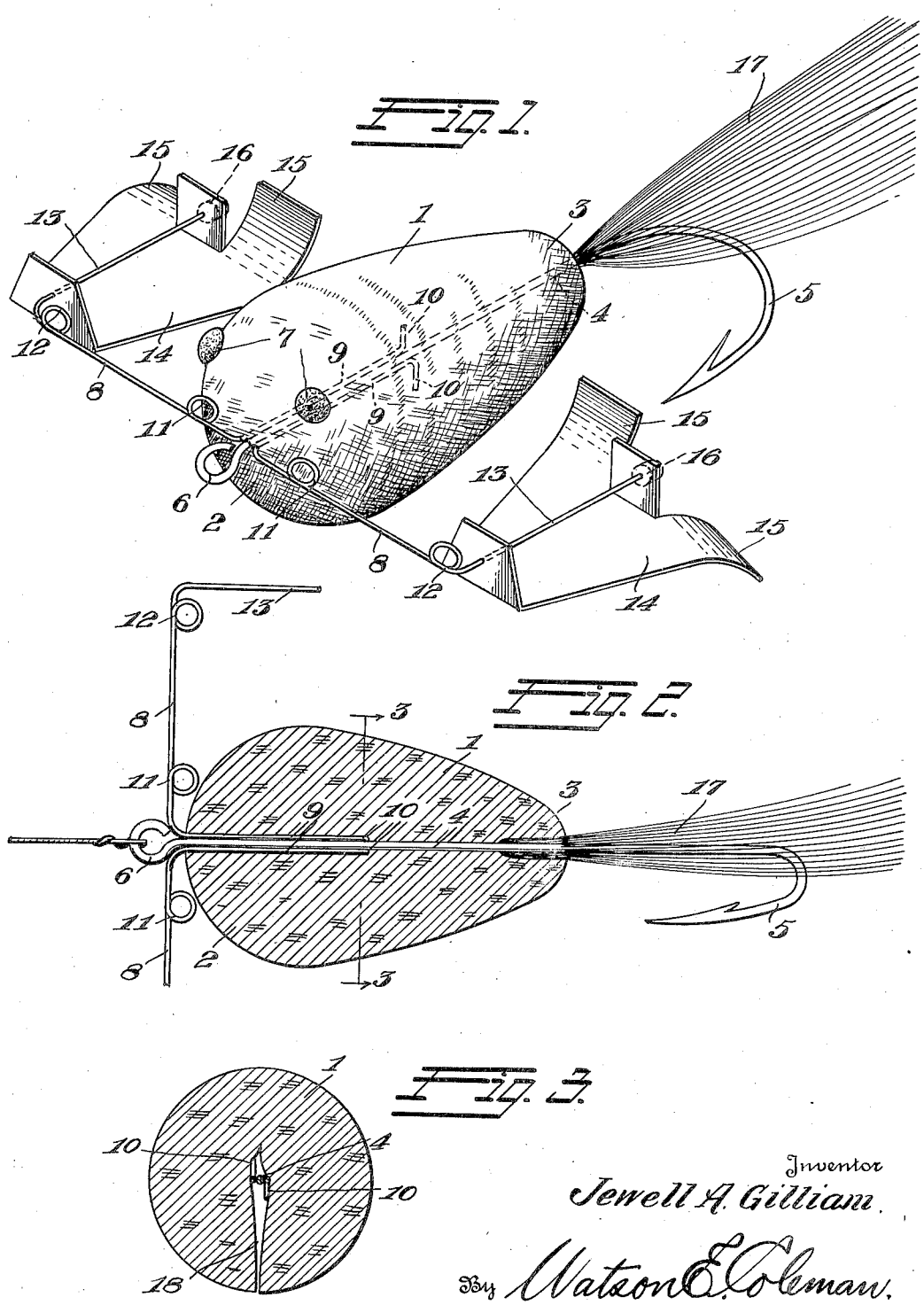

2,167,945

UNITED STATES PATENT OFFICE 2,167,945

FLY-ROD FISH LURE

Jewell A. Gilliam, Wingo, Ky.

Application April 7, 1938, Serial No. 200,778

2 Claims. (Cl. 43—48)

This invention relates to the class of fishing and trapping and pertains particularly to improvements in fishing lures, particularly lures of the fly type.

The primary object of the present invention is to provide a lure of the fly rod type which is so designed that in being cast it will simulate the actions of a living winged insect, in that portions of the lure are provided to act like the wings of an insect, thereby providing a particularly enticing lure for game fish which will take only insects which are alive and active.

Another object of the invention is to provide a fly rod type of fishing lure which is so designed that it will simulate the actions of a wounded winged insect and which, when cast, will strike the water with certain parts moving in such a manner as to give a suggestion of an insect fluttering its wings.

A still further object of the invention is to provide a fishing lure of the above described character having rotary parts which are so attached that they will function without turning or twisting the fishing line, thereby making it possible to cast the lure and to have the rotating parts thereof in action when the lure strikes the water without twisting or otherwise effecting the cast out line.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in perspective of the lure embodying the present invention.

Figure 2 is a longitudinal section through the body of the lure on the plane of the spinner carried arms.

Figure 3 is a transverse section on the line 3—3 of Figure 2.

Referring now more particularly to the drawing, the numeral 1 designates the body portion of the lure embodying the present invention. This body is preferably of circular cross sectional design, as illustrated in Figure 3 and it is also preferred that the body be tapered from one end to the other so that the head end, which is indicated by the numeral 2, will be of greater diameter than the rear or tail end 3.

The body of the lure is formed of any suitable material such as cork or the like and it has extending through its longitudinal center the shank portion 4 of a hook 5. The eye 6 of the hook extends from the center of the head 2 and, in addition to providing a means for attaching a line to the lure, simulates the nose of the insect, the portion of the body above the eye 6 being provided with markings 7 to represent the insect eyes.

Extending laterally from each side of the line attaching eye 5 is an arm 8 which is formed of a relatively light resilient wire and a portion of the inner end of each of these arms is turned at right angles, as indicated at 9, and extends into the body of the lure beside the shank 4 of the hook to which it is attached by soldering or in any other suitable manner and within the body of the lure each of these angle portions terminates in the angular finger 10, the finger of one portion 9 being turned upwardly in the body, while the other finger is turned downwardly thus insuring the firm attachment of the arms to the body so that they cannot be pulled out when a fish takes the hook 5.

Adjacent the point where each of the arms 8 turns and extends into the body of the lure, the arm is provided with a loop 11 and at its outer end each arm after being formed to provide a second or outer loop 12, is turned to provide the rearwardly extending spinner carrying portion 13 on which is mounted the substantially triangular spinner blade 14. Each of these spinner blades has its widest part at the rear end of the arm terminus 13 on which it is carried and the rear edge of each spinner is formed to provide the oppositely directed fins 15 so that the rotation of the spinner in the air, as well as in the water, is assured. A bead or any other suitable means, such as indicated at 16, may be secured upon the portion 13 of each arm to provide a bearing for the adjacent spinner and also to prevent the spinner from coming off.

The rear end of the body of the lure is provided with bucktail hair or feathers, as indicated at 17, which in addition to helping to make the lure look like an insect, serves to conceal the major portion of the hook.

While any suitable means may be employed for securing the hook shank 4 and the portions 9 and 10 of the arms in the body of the lure, one means of placing these elements in the body is shown in Figure 3 and comprises providing the body with a longitudinal slit, as indicated at 18, so that the hook shank and attached parts may be slipped into position and the slit may then be closed and held in this manner by any of the methods commonly used in the manufacture of fishing flies or other types of lures for binding parts together.

By providing the arms 8 with the loops 11 and 12 at the inner and outer ends of the arms, an additional resiliency is given the spinner carrying arms which they would not have if left straight so that in addition to the spinners turning upon the rearwardly extending portions 13 of the arms, they will have some slight movement longitudinally of the lure body to thus more effectively imitate the movements of an insect's wings.

I claim:

1. A fish lure of the character described, comprising an elongated body of buoyant material, said body being of an enlarged diameter at one end and tapering toward the other end, means at the said one end for attaching a fish line to the body whereby the body may be drawn longitudinally on the water, a hook member having a shank secured in the said other end of the body, shielding means for said hook secured in the said other end of the body, a pair of resilient arm members secured to the said enlarged end of the body at substantially the longitudinal center thereof and extending laterally in opposite directions, each of said arm members terminating in a rearwardly directed portion which lies rearwardly of the forward end of the body, and a spinner member mounted upon each of said rearwardly directed portions, each of said arms being provided between the body and the laterally directed portion thereof with a loop designed to impart resiliency thereto.

2. A fishing lure of the character described, comprising an elongated body of material, means at one end of the body for attaching a fish line thereto, a hook member secured to the body and having the hooked portion adjacent the end opposite from the line securing means, a pair of arm members secured to the end of the body adjacent the line securing means and extending in opposite directions from the body, each of said arm members having a portion of its outer end bent to extend rearwardly with respect to the body and in spaced parallel relation therewith, means forming an integral part of each arm facilitating the flexing of the arm, and a spinner supported upon each of the rearwardly extending portions of the arms and maintained thereby in spaced parallel relation with the body, the spinners being permitted slight rearward movement with respect to the body by reason of the said resiliency imparting means.

JEWELL A. GILLIAM.